Figures 1, 2:
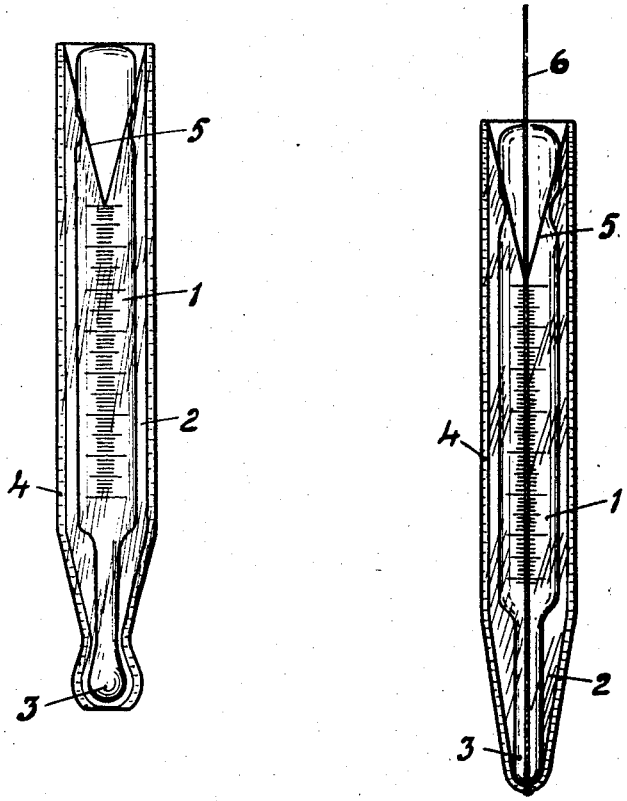

Dec. 1, 1959　　　M. DIAMANT　　　2,915,175
PROTECTIVE SHEATH FOR FEVER THERMOMETERS
Filed July 16, 1957

INVENTOR
Marcus Diamant

United States Patent Office 2,915,175
Patented Dec. 1, 1959

2,915,175

PROTECTIVE SHEATH FOR FEVER THERMOMETERS

Marcus Diamant, Halmstad, Sweden

Application July 16, 1957, Serial No. 672,854

Claims priority, application Sweden July 16, 1956

4 Claims. (Cl. 206—16.5)

The present invention relates to a protective sheath for thermometers, and particularly fever thermometers.

There has always been a considerable difficulty in properly sterilizing clinical thermometers. For obvious reasons, such thermometers cannot be sterilized by ordinary boiling, but usually after being used they are wiped off with a dab of cotton which has been soaked in alcohol or another disinfectant, whereupon they are kept in a soap solution until used again. Such sterilization and keeping of clinical thermometers usually does not fully comply with hygienic requirements and harbors the considerable danger that contagious diseases, particularly typhoid, paratyphoid, and polio, may be transmitted by a thermometer from one patient to the other or to the personnel of hospitals and other places where the same thermometer is used on different patients.

It is the principal object of the present invention to provide a sheath or cover for a thermometer for the purpose of overcoming the sterilizing difficulties and of preventing any possible damage or injury in the event of breakage of the thermometer either in the form of cuts from the broken glass or from the mercury spilling out of the thermometer.

According to the present invention, each thermometer is inserted into a protective sheath which remains on the thermometer while the temperature of a patient is being measured so that the thermometer itself will never come into direct contact with the patient. After the temperature of a patient has been measured, the sheath may be easily removed from the thermometer and discarded, and the thermometer may then be inserted into a new sterile sheath for measuring the temperature of another patient.

Another object of the invention is to provide a thermometer sheath as described which is preferably transparent so that the temperature of a patient may be read on the scale of the thermometer either through the sheath or without the sheath after it has been removed from the thermometer. For this reason, the sheath is preferably made of a transparent material, for example, a suitable plastic.

A further very important object of the invention is to provide a protective thermometer sheath as described which is designed so as also to protect the nurse or other person taking a patient's temperature from any possible infection from a contagious disease of the patient.

For this purpose, the sheath is made of a material which is flexible, supple, and elastic and designed so as to be withdrawn from the thermometer by pulling it over itself from one open end and by thus completely inverting it. Thus, any bacteria or other contamination adhering to the outside of the thermometer sheath will be enclosed on the inside thereof, and the person handling the thermometer cannot come into contact with the contaminated outside of the sheath.

A preferred feature of the invention for attaining this last-mentioned object consists in the provision of a thread which is secured at the inside of the sheath at the closed end thereof which is adapted to cover the bulb of the thermometer, and which extends through the opposite open end of the sheath to the outside. When this thread is grasped together with the handle portion of the thermometer and both are pulled together relative to the upper open end of the sheath, the closed end will pass upwardly with the thermometer bulb and the sheath will thus be inverted. This pull thread may also be used for ejecting the thermometer from the sheath, since the gradual inversion of the sheath will also remove the thermometer therefrom.

Further objects, features, and advantages of the present invention will be apparent from the following detailed description thereof, particularly when read with reference to the accompanying drawings, in which—

Fig. 1 shows a front view of a protective sheath according to the invention with a clinical thermometer therein; while Fig. 2 shows a thermometer sheath which is provided with a pull thread for inverting the sheath.

Referring to the drawings, Fig. 1 shows a conventional clinical thermometer 1 which is inserted in and enclosed by a thin tubular sheath 2 which preferably consists of a transparent elastic material, for example, a plastic sheath or the like. The sheath 2 is preferably made so as to be in such close engagement with the thermometer bulb 3 that no air which might produce an insulating action will remain between bulb 3 and the sheath. If the sheath is made of a foil, it will be folded around the thermometer bulb 3 in the longitudinal direction of the thermometer, whereupon the sides of the sheath will be fused together so that a longitudinal seam 4 will be formed. The most simple method of producing the sheath consists in spraying it so as not to have any seam.

For easily withdrawing the thermometer from the sheath and at the same time inverting the sheath, the closed end portion of sheath 2 is molded so as to fit around the bulb 3, and the open end portion is preferably provided with a wedge-shaped notch 5 through which the handle portion of the thermometer may be grasped. Thus, when the thermometer is pulled out of sheath 2, the closed end of the sheath will adhere to the bulb of the thermometer so that the entire sheath will be inverted and the contaminated part of the sheath will be turned inwardly.

According to the modification of the invention as illustrated in Fig. 2, a thread 6 made of textile fibers or a similar material is attached to sheath 2 at the inner closed end thereof and extends along the inner wall and through the open end. The thermometer which is inserted into this sheath may have either a bulb or be cylindrical. For removing the thermometer from sheath 2 and at the same time inverting the sheath, both the handle portion of the thermometer and the thread 6 are grasped together and pulled out of the sheath. The contaminated outside of the sheath will then be turned inwardly and away from any contact with the hands. If the pull thread is made of sufficient strength and adequately secured to the closed end of the sheath, it will serve not only as a means for inverting it but may also be used for ejecting the thermometer by means of such inversion.

The protective sheath may be very easily and inexpensively made, for example, by being molded by a continuous spraying method.

While the sheath is being withdrawn from the thermometer, the closed bottom end surrounding the thermometer bulb is always held attached thereto until all the other parts of the sheath have been inverted and stripped back over the bottom part. This insures that the contaminated outer wall of the sheath will be safely turned inwardly and never has to be touched.

Since the sheath according to the invention affords a hygienic protection from an insufficiently sterilized thermometer both for the patient as well as for the personnel handling the thermometer after the same has been used, and since neither of them will come in contact with the contaminated parts of the sheath, the present invention constitutes a valuable advance in the fight against contagious diseases. Naturally, the material of which the sheath is made must be absolutely nonporous and impermeable to bacteria. The pull thread must be secured to the sheath so that there will be no danger that the thread might cut or tear the sheath.

The thermometer sheath according to the invention is only intended for being used once and to be thrown away after use.

Having thus fully disclosed my invention, what I claim is:

1. A protective sheath for a clinical thermometer, comprising, in combination, an elongated tubular body of supple material defining an axial cavity therein extending between a closed end and an open end of said body, said cavity being adapted to receive said thermometer; and thread means having an attached end secured to said closed end of said body in said cavity, and a free end projecting from said open end, the portion of said thread means intermediate said ends thereof freely extending in said cavity, whereby said tubular body is inverted when said closed end is drawn into said cavity by said thread means.

2. A protective sheath for a clinical thermometer, comprising, in combination, an elongated tubular body of supple material defining an axial cavity therein extending between a closed end and an open end of said body, said cavity being adapted to receive said thermometer, said body being formed with a notch axially extending from said open end and communicating with said cavity; and thread means having an attached end secured to said closed end of said body in said cavity, and a free end projecting from said open end, the portion of said thread means intermediate said ends thereof freely extending in said cavity, whereby said tubular body is inverted when said closed end is drawn into said cavity by said thread means.

3. A temperature measuring arrangement for clinical purposes, comprising, in combination, an elongated thermometer having a temperature-sensitive end portion, an elongated tubular body of supple material defining an axial cavity therein extending between a closed end and an open end of said body, at least a portion of said thermometer being located in said cavity, said temperature-sensitive end portion being contiguously adjacent said closed end; and thread means having an attached end secured to said closed end of said body in said cavity, and a free end projecting from said open end, the portion of said thread means intermediate said ends thereof freely extending in said cavity, whereby said tubular body is inverted when said thread means and said thermometer are pulled out from said open end of said tubular body.

4. A temperature measuring arrangement for clinical purposes, comprising, in combination, an elongated thermometer having a temperature-sensitive end portion, an elongated tubular body of supple material defining an axial cavity therein extending between a closed end and an open end of said body, said thermometer being located in said cavity and substantially coextensive therewith in an axial direction, said temperature-sensitive end portion being contiguously adjacent said closed end, said body being formed with a notch axially extending from said open end and communicating with said cavity for access to an end portion of said thermometer remote from said temperature-sensitive end portion, and thread means having an attached end secured to said closed end of said body in said cavity, and a free end projecting from said open end, the portion of said thread means intermediate said ends thereof freely extending in said cavity, whereby said tubular body is inverted when said thread means and said thermometer are pulled out from said open end of said tubular body.

References Cited in the file of this patent

UNITED STATES PATENTS

| | | |
|---|---|---|
| 738,960 | Vaughan et al. | Sept. 15, 1903 |
| 748,752 | Koeneman | Jan. 5, 1904 |
| 2,677,965 | Saffir | May 11, 1954 |

FOREIGN PATENTS

| | | |
|---|---|---|
| 813,297 | Germany | Sept. 10, 1951 |